United States Patent
Neese

(10) Patent No.: US 8,363,281 B2
(45) Date of Patent: Jan. 29, 2013

(54) EFFICIENT IMAGE PRINTING WITH PRINTING SYSTEMS EMPLOYING PRINTHEADS WITH DROP EJECTORS PROVIDING MULTIPLE-SIZED DOTS

(75) Inventor: David A. Neese, Escondido, CA (US)

(73) Assignee: Eastman Kodak Company, Rochester, NY (US)

( * ) Notice: Subject to any disclaimer, the term of this patent is extended or adjusted under 35 U.S.C. 154(b) by 833 days.

(21) Appl. No.: 12/405,493

(22) Filed: Mar. 17, 2009

(65) Prior Publication Data

US 2010/0238511 A1    Sep. 23, 2010

(51) Int. Cl.
*H04N 1/40* (2006.01)
(52) U.S. Cl. .................... 358/3.23; 358/518
(58) Field of Classification Search ............... None
See application file for complete search history.

(56) References Cited

U.S. PATENT DOCUMENTS

| | | | |
|---|---|---|---|
| 4,916,545 A * | 4/1990 | Granger | 358/3.26 |
| 5,073,966 A | 12/1991 | Sato | |
| 5,729,625 A | 3/1998 | Miyake | |
| 6,203,133 B1 * | 3/2001 | Tanaka et al. | 347/15 |
| 6,315,391 B1 | 11/2001 | Kanematsu | |
| 7,031,021 B1 | 4/2006 | Lain et al. | |
| 7,350,902 B2 * | 4/2008 | Dietl et al. | 347/43 |
| 7,503,634 B2 * | 3/2009 | Takahashi et al. | 347/15 |
| 2006/0250624 A1 | 11/2006 | Spaulding et al. | |
| 2007/0280710 A1 * | 12/2007 | Tainer et al. | 399/44 |

OTHER PUBLICATIONS

Spaulding et al., "Methods for generating blue-noise dither matrices for digital halftoning," J. Electron. Imaging, vol. 6, pp. 208-230 (1997).

* cited by examiner

*Primary Examiner* — Charlotte M Baker
*Assistant Examiner* — Christopher D Wait
(74) *Attorney, Agent, or Firm* — Kevin E. Spaulding

(57) ABSTRACT

A method for printing an image with a printing system including the steps of multitoning image data to produce a multi-toned image having a multitone resolution; providing a look-up table, wherein each look-up table entry specifies a number of dots of a first size and a number of dots of a second size; using the look-up table to expand the multitoned image data from the multitone resolution to a print-ready image having a printing resolution; and printing the print-ready image using a first array of dot forming elements for forming dots of a first size and a second array of dot forming elements for forming dots having a second size that is greater than the first size.

20 Claims, 6 Drawing Sheets

EFFICIENT IMAGE PRINTING WITH PRINTING SYSTEMS EMPLOYING PRINTHEADS WITH DROP EJECTORS PROVIDING MULTIPLE-SIZED DOTS

FIELD OF THE INVENTION

This invention relates generally to the field of image processing prior to printing, and more particularly to an efficient way of handling image data for a printing system capable of printing with multiple-sized dots.

BACKGROUND OF THE INVENTION

Image data is typically provided to a printing system in the form of RGB data files that describe the color of each pixel of the image in terms of an amount of each of the additive primary colors (red, green and blue). For each of the three primary colors, 256 levels (8 bits) per pixel are generally provided to specify the amount.

Printing systems typically print with the subtractive colors cyan, magenta and yellow, and optionally black. Thus, image data needs to be converted from ROB color space to CMYK color space. In addition, many types of printing systems, such as inkjet printers, provide discrete dots of color in specified locations on paper or other recording medium. In binary printing, a dot of cyan, magenta, yellow or black is either printed in a given pixel location or not. In multi-pass printing, it is possible to print more than one dot of a particular color at a particular location. Additionally, some printers are capable of printing with inks of different densities (e.g. light cyan and dark cyan) or different dot sizes. In any case, the available number of colorant levels per dot location on the printed page is typically fir less than the 256 levels per primary color provided in the input image data. Furthermore, the number of pixels in an input data image might be on the order of a few million. The number of available dot locations for a printing system depends on both the printing resolution and the size of the recording medium. For an image printed by a desktop printer, the number of dot locations can be on the order of a hundred million. For an image printed by a wide format printer, the number of dot locations can be more than an order of magnitude larger. Thus, the image data must be scaled for the number of output pixels and halftoned or multitoned so that the large number of discrete dots of color on the recording medium adequately represent the intended appearance and color levels of the image.

For printing systems controlled by a host computer, some image processing tasks are performed in the printer driver of the host computer and some image processing tasks are performed in an image processing unit of the printing system. Especially for printing applications where the amount of printing data is very large, i.e. for high resolution or large size images or multiple densities of ink or multiple dot sizes, image rendering and transfer of the data to the printing system is not sufficiently fast. This can result in long wait times for image spooling prior to printing, or pauses during the printing process that can cause degradation in print quality. Printing delays can also occur in printing systems operating in a standalone mode where the image processing is all done within the printing system.

As is known in the art, a more efficient way of processing image data, rather than rendering the image at full printing resolution, is to first multitone the image at a lower resolution than the fall printing resolution, but at a higher number of multitone levels than the number of levels that the printing system is capable of printing. The compressed image data is then decoded using the higher number of multitone levels to specify a dot matrix pattern or superpixel to expand the image to full printing resolution.

Although such printing resolution expansion methods are known for compressed image data for the case where all printed dots for a particular color are substantially the same size, what has not been heretofore available is a method for expanding image data to full printing resolution for printing systems capable of selectably printing dots of a particular color with more than one dot size. In order to provide good image quality, efficient image data handling, and a well-controlled printing process, the method for data expansion needs to take into consideration characteristics of the printing process itself when expanding image data for the case where dots of substantially the same color can be printed in different sizes.

SUMMARY OF THE INVENTION

The present invention represents a method for printing an image with a printing system, comprising the steps of:

a) providing a first array of dot forming elements for forming dots of a first color and a first size;

b) providing a second array of dot forming elements for forming dots substantially equivalent to the first color and having a second size that is greater than the first size;

c) multitoning image data to produce a multitoned image having a multitone image resolution $R_{Mx} \times R_{My}$, and a number of multitone level values $L_M$, the multitone image resolution being lower than a printing resolution $R_{Px} \times R_{Py}$, and the number of multitone levels being higher than a number of printing levels $L_P$;

d) providing a look-up table, corresponding to the first color, wherein each value of the $L_M$ multitone level values corresponds to a look-up table entry specifying a number of dots of the first size and a number of dots of the second size;

e) using the look-up table, corresponding to the first color, to expand the mutitoned image data from the multitone resolution to a print-ready image having the printing resolution; and f) printing the print-ready image using the first array of dot forming elements and the second array of dot forming elements.

An advantage of the present invention is that it provides a method for efficient data processing and data transfer in a printing system using multiple drop sizes, while taking into account characteristics of the printing process.

The present invention has the additional advantage that it provides control over the patterns of dots of different sizes, and the relative usage of different inks and drop sizes, thus enabling control over artifacts such as coalescence, banding and grain and grid patterns. This also provides for better thermal control of the printhead, and enables a higher effective firing frequency.

DETAILED DESCRIPTION OF THE INVENTION

Figure 1:
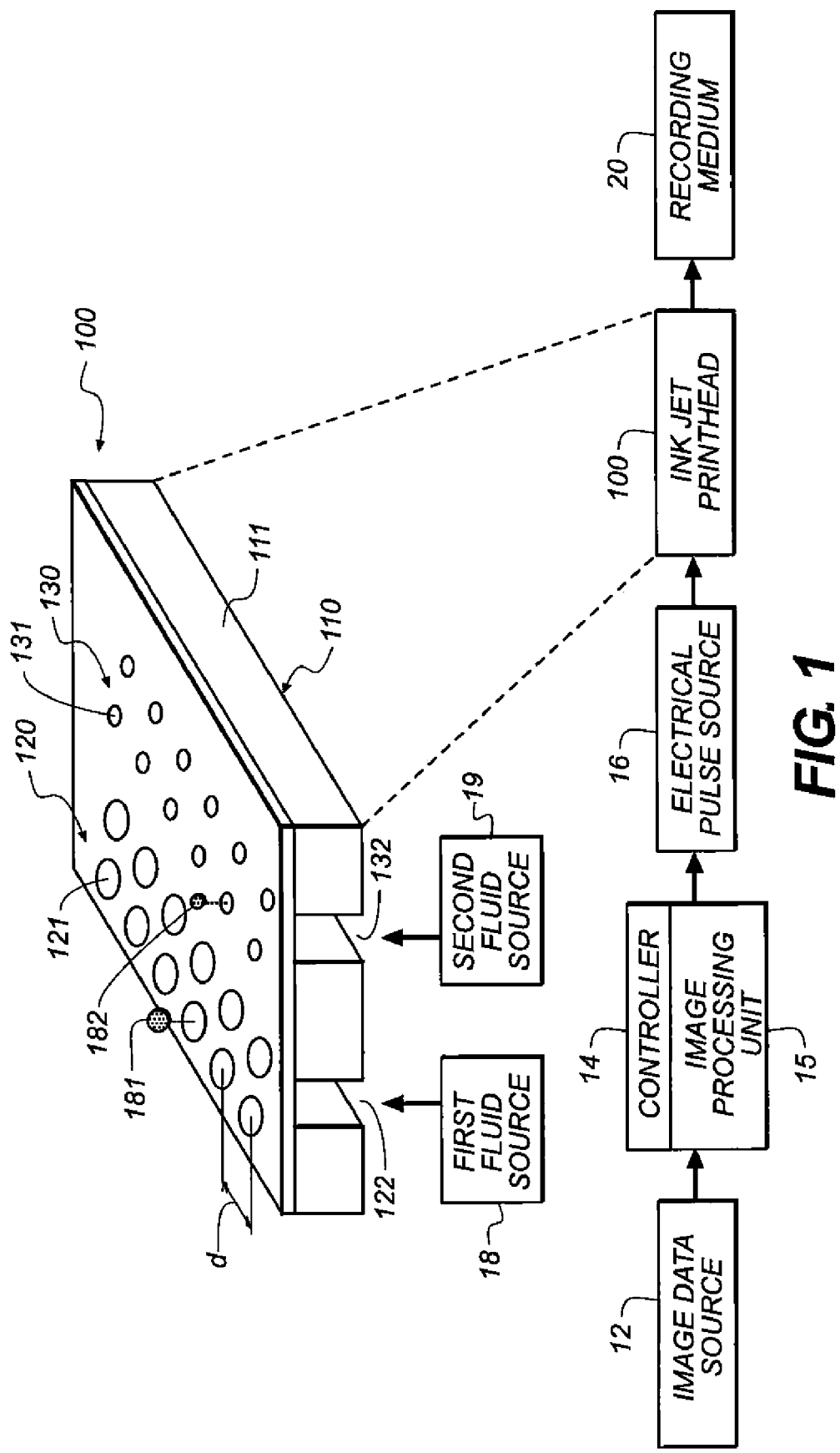
FIG. 1 is a schematic representation of an inkjet printer system that can be used in accordance with the present invention.

Referring to FIG. 1, a schematic representation of an inkjet printer system is shown, for its usefulness with the present invention and is fully described in U.S. Pat. No. 7,350,902, which is incorporated by reference herein in its entirety. The inkjet printer system includes an image data source 12, which provides data signals that are interpreted by a controller 14 as being commands to eject drops. Controller 14 includes an image processing unit 15 for rendering images for printing, and outputs signals to an electrical pulse source 16 of electrical energy pulses that are inputted to an inkjet printhead 100, which includes at least one inkjet printhead die 110. Optionally, image processing unit 15 is partially included directly in the inkjet printer system, and partially included in a host computer.

In the example shown in FIG. 1, there are two nozzle arrays. Nozzles 121 in the first nozzle array 120 have a larger opening area than nozzles 131 in the second nozzle array 130. In this example, each of the two nozzle arrays has two staggered rows of nozzles, each row having a nozzle density of 600 per inch. The effective nozzle density then in each array is 1200 per inch (i.e. $d=1/1200$ inch in FIG. 1). If pixels on the recording medium 20 were sequentially numbered along the paper advance direction, the nozzles from one row of an array would print the odd numbered pixels, while the nozzles from the other row of the array would print the even numbered pixels.

In fluid communication with each nozzle array is a corresponding ink delivery pathway. A first ink delivery pathway 122 is in fluid communication with the first nozzle array 120, and a second ink delivery pathway 132 is in fluid communication with the second nozzle array 130. Portions of ink delivery pathways 122 and 132 are shown in FIG. 1 as openings through substrate 111. One or more inkjet printhead die 110 will be included in inkjet printhead 100, but for greater clarity only one inkjet printhead die 110 is shown in FIG. 1. The printhead die are arranged on a support member as discussed below relative to FIG. 2. In FIG. 1, first fluid source 18 supplies ink to the first nozzle array 120 via the first ink delivery pathway 122, and second fluid source 19 supplies ink to the second nozzle array 130 via the second ink delivery pathway 132. Although distinct fluid sources 18 and 19 are shown, in some applications it can be beneficial to have a single fluid source supplying ink to both the first nozzle array 120 and the second nozzle array 130 via ink delivery pathways 122 and 132, respectively. Also, in some embodiments, fewer than two or more tan two nozzle arrays can be included on printhead die 110. In some embodiments, all nozzles on inkjet printhead die 110 can be the same size, rather than having multiple sized nozzles on inkjet printhead die 110.

Not shown in FIG. 1, are the drop forming mechanisms associated with the nozzles. Drop forming mechanisms can be of a variety of types, some of which include a heating element to vaporize a portion of ink and thereby cause ejection of an ink droplet, or a piezoelectric transducer to constrict the volume of a fluid chamber and thereby cause ejection of an ink droplet, or an actuator which is made to move (for example, by heating a bi-layer element) and thereby cause ejection of an ink droplet. In any case, electrical pulses from electrical pulse source 16 are sent to the various drop ejectors according to the desired deposition pattern. In the example of FIG. 1, ink droplets 181 ejected from the first nozzle array 120 are larger than ink droplets 182 ejected from the second nozzle array 130, due to the larger nozzle opening area. Typically other aspects of the drop forming mechanisms (not shown) associated respectively with nozzle arrays 120 and 130 are also sized differently in order to optimize the drop ejection process for the different sized drops. During operation, droplets of ink are deposited on the recording medium 20.

Figure 2:
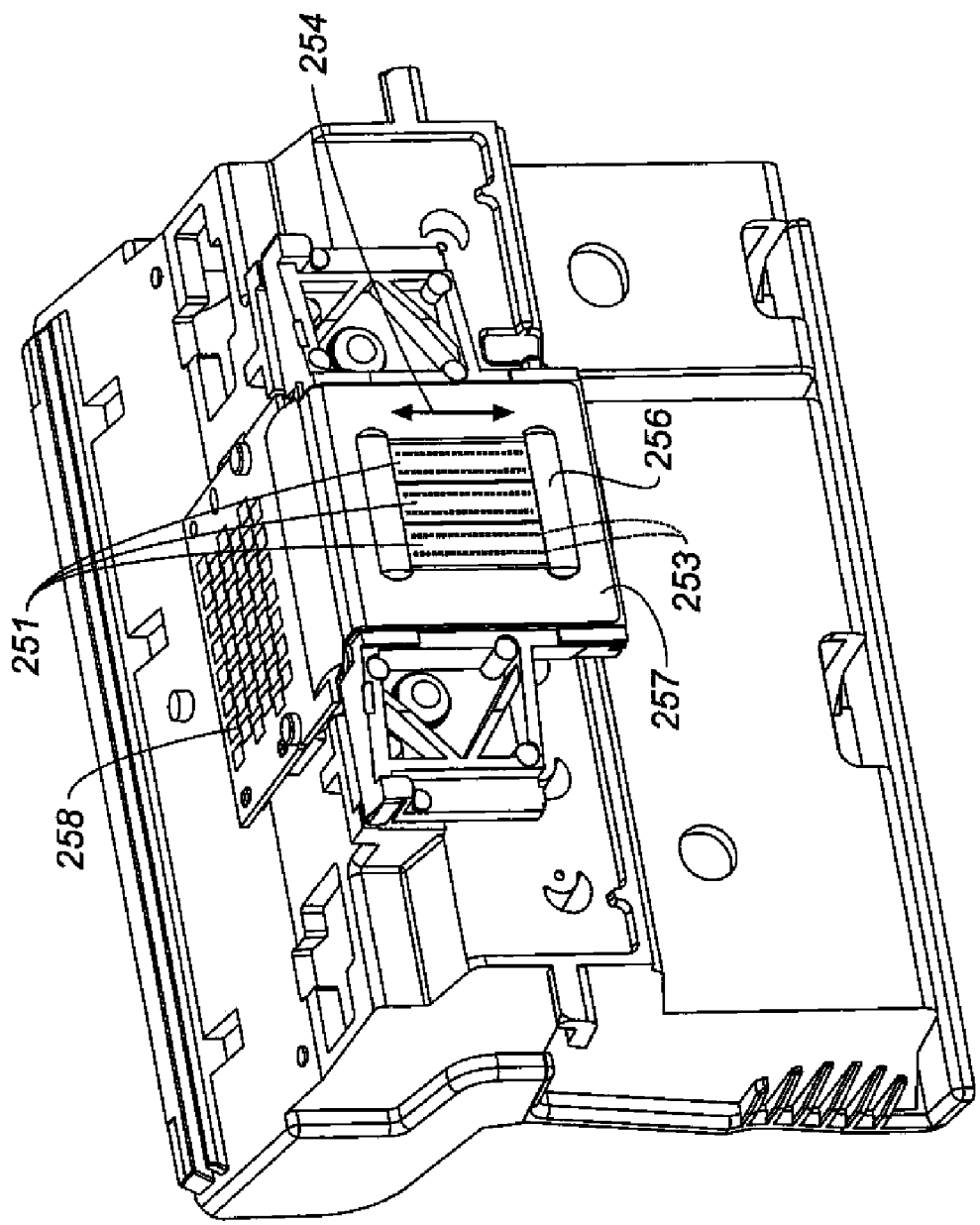
FIG. 2 is a perspective of a portion of a printhead chassis that can be used in the inkjet printer system of FIG. 1.

FIG. 2 shows a perspective of a portion of a printhead chassis 250, which is an example of an inkjet printhead 100 as shown in FIG. 1. Printhead chassis 250 includes three printhead dies 251 (similar to printhead die 110 in FIG. 1), each printhead die 251 contains two nozzle arrays 253, so that printhead chassis 250 contains six nozzle arrays 253 altogether. The six nozzle arrays 253 in this example can be each connected to separate ink sources (not shown), such as cyan, magenta, yellow, text black, photo black, and a colorless protective printing fluid. Alternatively, two different nozzle arrays 253 having different nozzle sizes in each array for each printhead die 251 can be connected to the same ink source or substantially equivalent ink sources, so that for a first die 251, the large nozzles and the small nozzles each print cyan ink, for a second die 251, the large nozzles and the small nozzles each print magenta ink, and for a third die 251, the large nozzles and the small nozzles each print yellow ink. Additional printhead die 251 can be provided in the same printhead chassis 250 or in a different printhead chassis to provide large and small nozzles that print different colors or different densities of ink.

Each of the six nozzle arrays 253 is disposed along nozzle array direction 254, and the length of each nozzle array along the nozzle array direction 254 is typically on the order of 1 inch or less. Typical lengths of recording media are 6 inches for photographic prints (4 inches by 6 inches), or 11 inches for cut sheet paper (8.5 by 11 inches) in a desktop carriage printer, or several feet for roll-fed paper in a wide format printer. Thus, in order to print a full image, a number of swaths are successively printed while moving printhead chassis 250 across the recording medium 20. Following the printing of a swath, the recording medium 20 is advanced in a direction that is substantially parallel to nozzle array direction 254.

Also shown in FIG. 2 is a flex circuit 257 to which the printhead die 251 are electrically interconnected, for example, by wire bonding or TAB bonding. The interconnections are covered by an encapsulant 256 to protect them. Flex circuit 257 bends around the side of printhead chassis 250 and connects to connector board 258. When printhead chassis 250 is mounted into the carriage 200 (see FIG. 3), connector board 258 is electrically connected to a connector (not shown) on the carriage 200, so that electrical signals can be transmitted to the printhead die 251.

Figure 3:
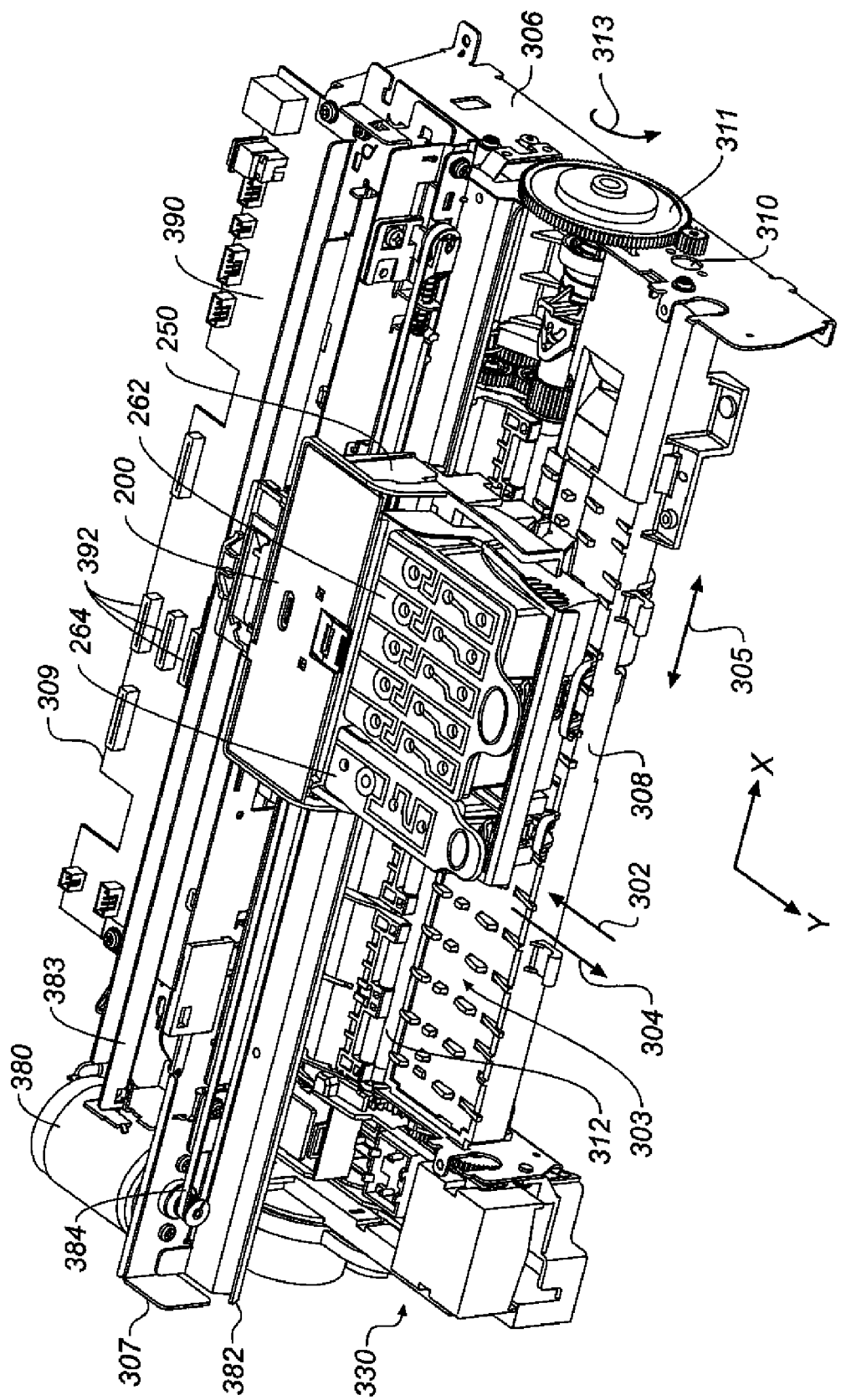
FIG. 3 is a perspective of a portion of a carriage printer.

FIG. 3 shows a perspective of a printer chassis for a desktop carriage printer. Some of the parts of the printer have been hidden in the view shown in FIG. 3 so that other parts can be more clearly seen. The printer chassis has a print region 303 across which carriage 200 is moved back and forth in carriage scan direction 305 along the X axis, between the right side of printer chassis 306 and the left side of printer chassis 307, while drops are ejected from printhead die 251 (not shown in FIG. 3) on printhead chassis 250 that is mounted on carriage 200. Carriage motor 380 moves belt 384 to move carriage 200 along carriage guide rail 382. An encoder sensor (not shown)

is mounted on carriage 200 and indicates carriage location relative to an encoder fence 383.

Printhead chassis 250 is mounted in carriage 200, and ink supplies 264 are mounted in the printhead chassis 250. The mounting orientation of printhead chassis 250 is rotated relative to the view in FIG. 2, so that the printhead die 251 are located at the bottom side of printhead chassis 250, the droplets of ink being ejected downward onto the recording medium in print region 303 in the view of FIG. 3. Paper or other recording medium (sometimes generically referred to as paper or media herein) is loaded along paper load entry direction 302 toward the front of printer chassis 308.

Figure 4:
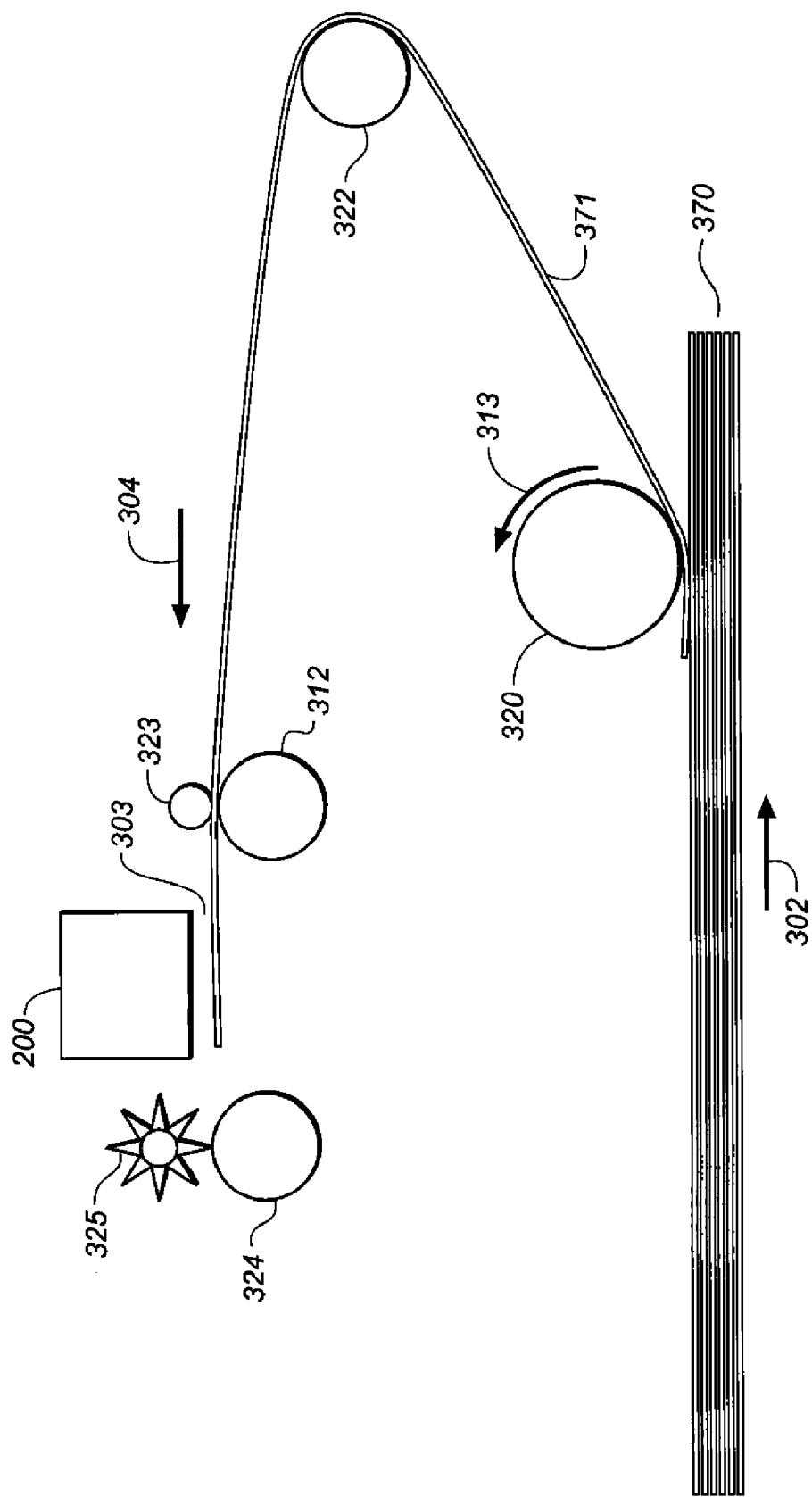
FIG. 4 is a schematic side view of an exemplary paper path in a carriage printer.

A variety of rollers are used to advance the medium through the printer as shown schematically in the side view of FIG. 4. In this example, a pick-up roller 320 moves the top piece or sheet 371 of a stack 370 of paper or other recording medium in the paper load entry direction 302. A turn roller 322 acts to move the paper around a C-shaped path (in cooperation with a curved rear wall surface) so that the paper continues to advance along media advance direction 304 from the rear of the printer chassis 309 (with reference to FIG. 3). The paper is then moved by feed roller 312 and idler roller(s) 323 to advance along the Y axis across print region 303, and from there to a discharge roller 324 and star wheel(s) 325 so that printed paper exits along media advance direction 304. Feed roller 312 includes a feed roller shaft along its axis, and feed roller gear 311 (see FIG. 3) is mounted on the feed roller shaft. Feed roller 312 can include a separate roller mounted on the feed roller shaft, or can include a thin high friction coating on the feed roller shaft. A rotary encoder (not shown) can be coaxially mounted on the feed roller shaft in order to monitor the angular rotation of the feed roller.

The motor that powers the paper advance rollers is not shown in FIG. 3, but the hole 310 on the right side of the printer chassis 306 is where the motor gear (not shown) protrudes through m order to engage feed roller gear 311, as well as the gear for the discharge roller (not shown). For normal paper pick-up and feeding, it is desired that all rollers rotate in forward rotation direction 313. Toward the left side of the printer chassis 307, in the example of FIG. 3, is the maintenance station 330.

Toward the rear of the printer chassis 309, in this example, is located the electronics board 390, which includes cable connectors 392 for communicating via cables (not shown) to the printhead carriage 200 and from there to the printhead chassis 250. Also on the electronics board are typically mounted motor controllers for the carriage motor 380 and for the paper advance motor, a processor or other control electronics (shown schematically as controller 14 and image processing unit 15 in FIG. 1) for controlling the printing process, and a connector for a cable to a host computer.

Processing the image data from image source 12 includes converting from the 8 bit per primary color RGB data into printed dots of various hues, sizes, and optionally ink densities in a way that provides an accurate and pleasing representation of the image. For a thermal inkjet printer, this conversion should consider maximizing the available color gamut, avoiding coalescence of ink drops, minimizing image noise or graininess, avoiding overheating of printheads, minimizing the amount of data that needs to be processed and transferred, and balancing the amount of ink ejected from large nozzles and small nozzles. All of these must be considered across a wide range of recording media for various print modes and at various printing speeds.

Image processing tasks that are typically performed in the printer driver in the host computer include profiling scaling, inverting, color mapping, screening, and compression. The RGB image can be profiled to adjust the RGB values so that the printed colors will match the color of the original image. The image is scaled to the final output size at a processing resolution that is less than the printing resolution, in order to reduce the amount of data for processing and transferring. The data is inverted to convert it into a generic CMY format. Color mapping is used to translate the generic CMY data into amounts of ink that are appropriate for the particular printing process, inks, dot sizes, recording media, and print modes in order to produce a particular color. One advantageous method of color mapping for a printing system wing four or more colorants is described in US Patent Application Publication No. 2006/0250624, which is incorporated herein by reference.

In a particular example of a printing system, there are eight different inks that can be used to print a given image (cyan, magenta, yellow, black, light cyan, light magenta, light black, and clear ink), and there are also two different sized dots that can be printed for each ink at a printing resolution in the x and y directions of $R_{Px}$=1200 dots per inch and $R_{Py}$=1200 dots per inch using the two different sized nozzles in first and second nozzle arrays 120 and 130 described with reference to FIG. 1. If image scaling was done to provide a processing resolution (or multitoning resolution in the x and y directions) of $R_{Mx}$=600 dots per inch and $R_{My}$=600 dots per inch, then after the color mapping step, the image data would consist of eight color planes of 600 dpi by 600 dpi 8-bit data. The eight color planes are then each multitoned down to 2 bits per pixel, using a method such as error diffusion to determine the 2-bit values with minimal loss of image information. The number of multitone levels that can be described by the 2 bits per pixel is 4, which is larger than the number of printing levels (2) that are required to specify at each dot location whether a given nozzle should print a dot or not. This larger number of multitone levels is subsequently used as described below to expand the multitoned image from the lower multitone resolution to the higher printing resolution, and also to specify how many large dots and small dots should be used.

The steps described above that are typically performed by the printer driver in the host computer can also be described as follows: Image data is multitoned to produce a multitoned image having a multitone image resolution of $R_{Mx} \times R_{My}$, and a number of multitone levels $L_M$, such that the multitone image resolution is lower than the printing resolution $R_{Px} \times R_{Py}$, and the number of multitone levels $L_M$ is higher than the number of printing levels $L_P$. It is advantageous if the product $R_{Mx} \times R_{My}$ is less than the product $R_{Px} \times R_{Py}$, but it is not required that both $R_{Mx} < R_{Px}$ and $R_{My} < R_{Py}$. Note that for standalone printing systems where a host computer is not responsible for a portion of the image processing, these steps can be done in the printing system itself.

Because the image data was scaled to a lower multitoning resolution $R_{Mx} \times R_{My}$ (600 dpi by 600 dpi) than printing resolution $R_{Px} \times R_{Py}$ (1200 dpi×1200 dpi) and for 8 color planes (one per color ink) rather than for 16 color planes (one per color ink per dot size), the color mapping and screening algorithms only need to work on eight planes of 600 dpi data rather than on sixteen planes of 1200 dpi data. In addition, the amount of data that needs to be transferred from the host computer to the printing system is similarly reduced. This results in a very significant reduction in image processing time, which enables smaller delay times due to image spooling prior to printing. It has been found for example that for a wide format printing system capable of printing at 25 to 90 square feet per hour (depending on print mode) with eight colors of inks and two dot sizes printed at a resolution of 1200 dpi×1200 dpi, less than 10% of the multitone image is required to be spooled prior to printing.

After the multitoned image data is transferred to the printing system, the 600 dpi×600 dpi, 8-plane, 2-bit data needs to be expanded into 1200 dpi×1200 dpi, 16-plane, 1-bit data The 2-bit data describes, in 4 levels, how much ink should be put down on the recording medium at a given 600 dpi×600 dpi location, i.e. in a 2×2 group of dot locations at 1200 dpi×1200 dpi. In particular, each of the $L_M=4$ multitone level values corresponds to a 2×2 look-up table entry that specifies a number of small dots and a number of large dots to be printed in that 2×2 location. The look-up tables are stored in printing system memory.

In the present example the printing resolution in the x direction $R_{Px}$ (1200 per inch) is 2 times the multitone image resolution in the x direction $R_{Mx}$ (600 per inch), and similarly for the y direction $R_{Py}$ is 2 times $R_{My}$. More generally, the printing resolution in the x and y directions is usually an integer multiple of the multitone image resolution, i.e. $R_{Px}=n \times R_{Mx}$ and $R_{Py}=R_{My}$. It is advantageous if n×m>1, even if n=1 or m=1. In the present example, each value of the multitone levels corresponds to a 2×2 matrix of entries, but more generally, each value of the multitone levels corresponds to an n×m matrix of entries in order to expand the multitoned image data from the multitone resolution to a print-ready image having a printing resolution for small dots and large dots.

Figure 5:
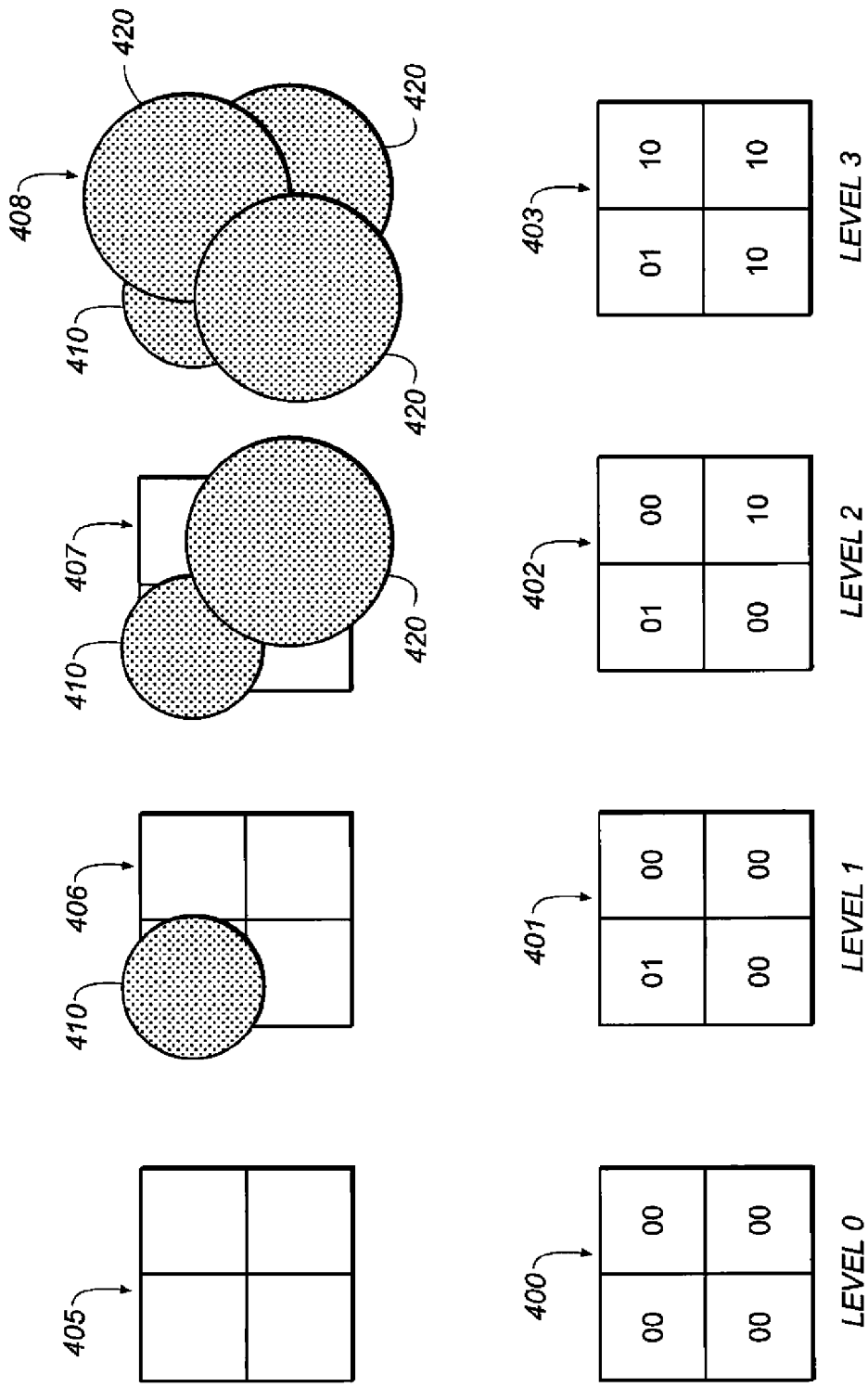
FIG. 5 shows an example of a look-up table for large dots and small dots corresponding to values of multitone levels, according to an embodiment of this invention.

FIG. 5 shows an example of a look-up table with four entries corresponding to the four multitone level values for a particular color ink and a particular recording medium. Each entry of the look-up table can be referenced to corresponding 2×2 matrices 400-403, indicating the number and positions of large dots and small dots for that level. There are a variety of ways that the dots can be specified in the look-up table entries. For example, a 2-bit binary number can be stored in each position of the matrix. In particular, 00 can correspond to no dots being printed in a particular location, while 01 can correspond to a small dot but no large dot being printed, and 10 can correspond to a large dot but no small dot being printed. Depending on the amount of ink corresponding to a large drop and a small drop, it can be a rule in some embodiments that no dot location ever receives more than one dot of the same color ink. In such a case, no position of the matrix would be specified to have more than one dot, and the binary number 11 would not occur in the matrix. In other embodiments, it would be permissible to print two small drops of the same color ink in the same dot location (e.g. in different printing passes). In such a case, the binary number 11 can be chosen to represent two small drops being printed in the particular dot location. In still other embodiments, the binary number 11 can be chosen to represent a large drop and a small drop of the same color ink being printed in the particular dot location.

Corresponding dot patterns 405-408 are illustrated in the upper half of FIG. 5, showing a graphical representation of the pattern of the large dots and small dots. In this example, level 0 specifies that no ink should be printed in the 2×2 group of dot locations, so 2×2 matrix 400 has no dots specified (all positions are 00), and dot pattern 405 shows no dots. Level 1 specifies only one small drop of ink should be printed in the 2×2 group, so one position in 2×2 matrix 401 indicates 01 and the others indicate 00. The corresponding dot pattern 406 shows a single small dot 410 in the upper left quadrant. Level 2 specifies one small drop and one large drop of ink should be printed in the 2×2 group as shown in 2×2 matrix 402. This is reflected in dot pattern 407, which shows a small dot 410 in the upper left quadrant and a large drop 420 in the lower right quadrant. The configuration of the large dot and small dot is that they are diagonally adjacent, rather than horizontally or vertically adjacent. Level 3 specifies one small drop and three large drops should be printed in the 2×2 group of dot locations as shown in 2×2 matrix 403 and dot pattern 408.

The graphical representation in FIG. 5 is meant to provide an indication of ink coverage for each level. In this example, the size of each of the four squares in the 2×2 group represents approximately 21 microns by 21 microns, corresponding to 1200 per inch resolution. The dot size is meant to correspond approximately to the dot size of a drop of ink that has spread after hitting the recording medium. In particular, the dot size of the small dot is assumed to be approximately 28 microns and the dot size of the large dot is assumed to be approximately 40 microns. The amount of ink lay down can also be described with respect to drop volume of the ink drops. For example, if nozzles in nozzle array 120 eject a drop size of about 6 pL, and if nozzles in nozzle array 130 eject a drop size of about 3 pL, then Level 1 corresponds to 3 pL of ink per square of side 42 microns, Level 2 corresponds to 9 pL of ink per square of side 42 microns, and Level 3 corresponds to 21 pL of ink per square of side 42 microns. The different look-up table entries are predetermined empirically for each color ink and a variety of recording medium types. For the exemplary look-up table shown in FIG. 5, 21 pL of that color ink on that recording medium is found to represent fill ink coverage. For a different color ink or a different recording medium or a different print mode, the amount of ink spread can be different, so that there should be a different number of large drops and small drops specified for Level 3.

Figure 6:
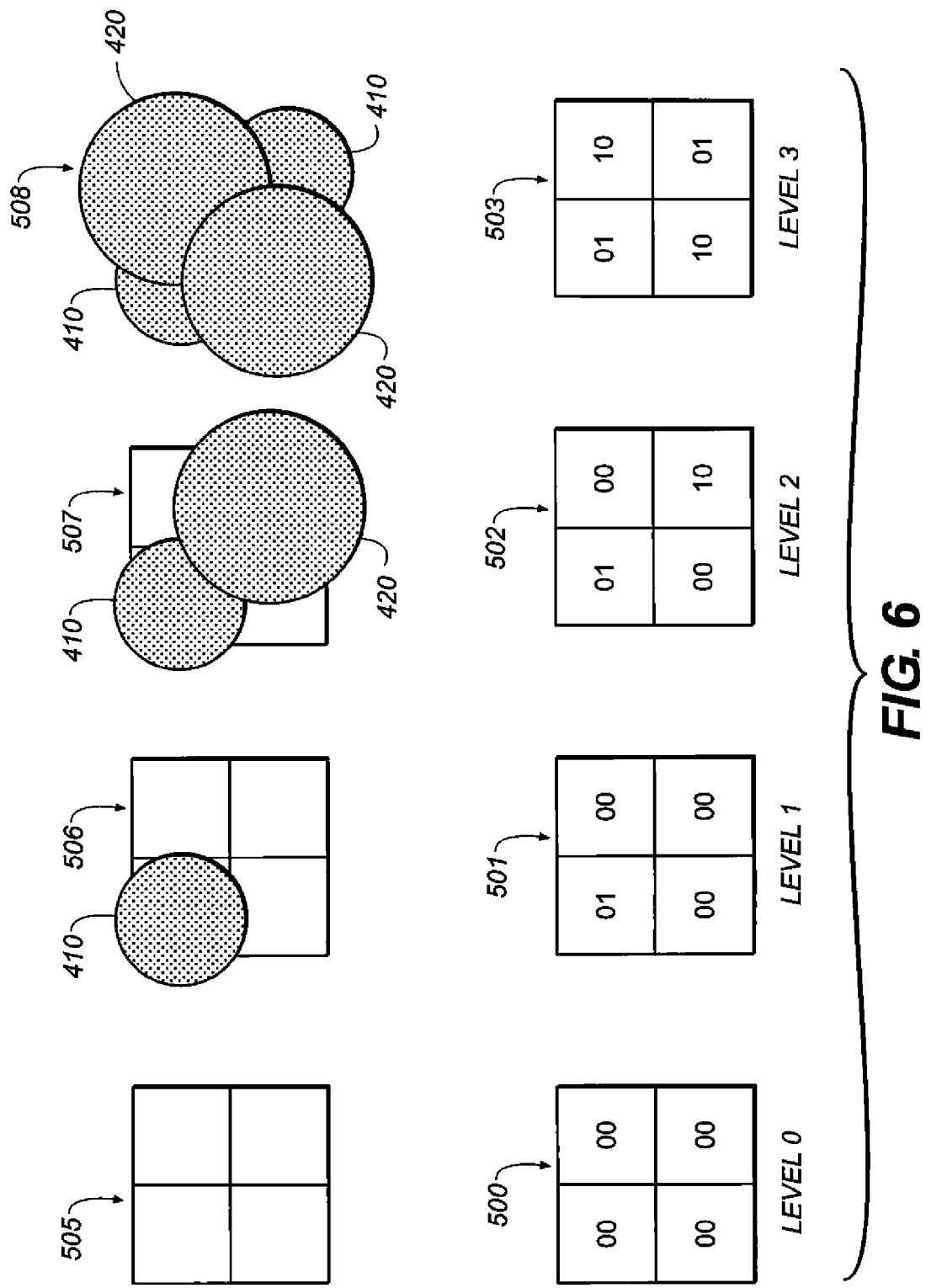
FIG. 6 shows an example of a look-up table for large dots and small dots corresponding to values of multitone levels, according to an embodiment of this invention.

FIG. 6 shows a different look-up table corresponding either to a different color ink or to a different type of recording medium. The look-up table in FIG. 6 is very similar to that in FIG. 5, having 4 2×2 matrices 500-503 and producing 4 corresponding dot patterns 505-508. The only difference is that in Level 3 in FIG. 6, there are two small dots and two large dots rather than one small dot and three large dots. In terms of ink volume for Level 3 of the look-up table shown in FIG. 6, there is a drop volume of 18 pL per square of side 42 microns. The same volume of ink can be provided by three large dots and one empty dot location, but the two large dots and two small dots provide better ink coverage for the 2×2 pixel grouping.

By specifying the dot combinations in the look-up table, it is possible to eliminate or reduce the occurrence of dot patterns or dot incidence rates that can cause degradation in the image or in the printing process. For example, note that neither of the look-up tables in FIG. 5 or FIG. 6 include the pattern of two small dots that are diagonally adjacent in the 2×2 group. For the example of 28 micron diameter dots on a 21 micron grid (1200 dpi), two diagonally adjacent dots would be barely not touching (by about 2 microns) if placed on their ideal centers. However, jet misdirection, media advance errors or dot size nonuniformity can cause some diagonally adjacent pairs to overlap, and some diagonally adjacent pairs not to overlap. The apparent variation in ink coverage would be overly sensitive to dot position errors, leading to noise in the image.

Secondly, note that Level 1 uses 1 small dot but no large dots for both look-up tables. This ensures that only small dots are used in the image highlights. The use of isolated larger dots would result in image graininess.

In the present example, Level 2 uses a diagonally adjacent large dot and small dot. In this case, since the small dot diameter is 28 microns and the large dot diameter is 40 microns, there is sufficient dot overlap such that jet misdirection, media advance errors or dot size nonuniformity is not expected to cause nonoverlap for diagonally adjacent pairs.

Level 3 uses three large dots and one small dot in FIG. 5, or two large dots and two small dots in FIG. 6. An important consideration for Level 3 is the provision of enough ink for full coverage without putting down excessive ink that can cause media cockling, slow drying, and ink wastage. In addition, the balance of ink coverage provided by large nozzles and small nozzles can have important implications for printing throughput. It is well known that small ink drops are not as efficient as large ink drops are in carrying off heat generated by a thermal inkjet drop ejector. Note that small dots are used in only one of the four locations for all levels shown in FIGS. 5 and 6, except for Level 3 in FIG. 6, where two small dots are used. By using the n×m matrices of the look-up tables stored in printing system memory to constrain the number of small dots to be 50% or less of the n×m dot locations for each level, it can be ensured that the printhead will not overheat, which would require slowing down of the printing process. Even if third party image processing software in the host computer is used, which is not sensitive to printing system characteristics, the look-up tables in the printing system can ensure that disadvantageous combinations of large and small dots are reduced or eliminated.

Similarly, note that Level 3 in FIGS. 5 and 6 does not specify a large dot at all four locations. It is well known that refill frequency is faster for small ink drops than it is for large ink drops. By sharing the ink coverage for a color between the large drops and the small drops (i.e. having the maximum number of large dots specified in the n×m matrix to be less than n times m), the effective required refill frequency of the drop ejectors for large drops is reduced, so that printing throughput can be high.

Although the matrices of the look-up tables specify dot positions for the large dots and the small dots at each level, it is generally not desirable to maintain that same dot position for all n×m pixel groupings at that level for that color within the image. In particular, for regions of an image having a uniform color, maintaining the same dot position across a number of adjacent n×m pixel groupings would cause undesirable image artifacts such as grids or lines that would be noticeable to the eye. Therefore an additional step is taken to randomize the dot positions of the n×m pixel groupings for a particular color level. Dot relationships within a level can be preserved in such a randomization For example, with reference to level 2 in FIG. 5, all of the different configurations can have a small dot that is diagonally adjacent to a large dot, but the small dot can be in the upper left corner, the upper right corner, the lower left corner or the lower right corner. In addition to the n×m matrix specifying the dot relationships to expand to fall printing resolution, an alteration operation is performed on the dot positions specified by the n by m matrix such that the positions are selectively rotated, flipped horizontally, flipped vertically, flipped both horizontally and vertically, left intact, and so forth. For example, the particular alteration operation can be selected by a pseudo-random number generator, or a set of pixel-location-dependent alteration rules.

The process described above of multitoning the image data to a lower resolution but higher number of levels than the printing resolution and the printing levels and then using look-up tables to expand the multitoned image data to a print-ready image having the full printing resolution for large dots and small dots is performed for each color. In the example where the printing system includes N=8 colors for printing (cyan, light cyan, magenta, light magenta, black, light black, yellow and clear inks), each color ink being printable using a pair of arrays of drop ejectors for printing two different dot sizes, the multitoning and expansion process would be done for each of the eight colors. In this example, the N varieties of ink include both differences in colorant or hue (e.g. cyan versus magenta versus clear) and density (e.g. light cyan versus cyan). Even though the same colorant (cyan pigment or cyan dye) can be used in both the light cyan ink and the cyan ink, the density of colorant is substantially different, so that the color produced when printing the two different inks on recording medium is noticeably different to the eye.

Ea some embodiments, the look-up tables for one color ink can be the same as the look-up tables for another color ink. However, for some colors, print modes or media, the look-up tables for two different colors can be different, as was indicated in the example of FIGS. 5 and 6. In order to provide the range of colors required for the image, a given grouping of n×m pixels can have one nonzero level for one color and a different nonzero level for another color or colors.

Although it is not necessary that the small dots and large dots of one color be the same sizes as the small dots and large dots of another color, in some embodiments they are designed to be substantially the same sizes from one color to another. Similarly, it is not required that the large dots and the small dots, corresponding to a given pair of arrays of drop ejectors, be exactly the same color. It is contemplated that the drop ejectors for the large dots can be fed by an ink variety that is substantially equivalent to, but not identical to, the ink variety that feeds the drop ejectors for the small dots.

A printing system can include a greater number of inks than is used to print a particular image. For example, the printing system can include both a matte black ink and a photo black ink, where for some images one of them is used but not the other. Ea such cases, the image data for the nonselected ink would simply be zeros. After the image data has been multitoned and expanded for all N color inks appropriate for printing a given image, the printing system is instructed by controller 14 to print the image using the small and large nozzles for the different colors, as needed.

In the embodiments described above, two different sizes of dots were used for each substantially equivalent ink variety. In still other embodiments, three or more different dot sizes can be used for one or more ink variety. In such an embodiment, the different values of the multitone levels would correspond to n×m matrices specifying the number and position of dots of the various available dot sizes.

The invention has been described in detail with particular reference to certain preferred embodiments thereof, but it will be understood that variations and modifications can be effected within the spirit and scope of the invention. En particular, the dot forming elements described in the embodiments above have been inkjet drop ejectors. However, the invention applies more broadly to image data processing for other printing technologies capable of printing with multiple-sized dots.

PARTS LIST 12 image data source
14 Controller
15 Image processing unit
16 Electrical pulse source
18 First fluid source
19 Second fluid source
20 Recording medium
100 Inkjet printhead
110 Inkjet printhead die
111 Substrate
120 First nozzle array 121 Nozzle(s)
122 First ink delivery pathway
130 Second nozzle array
131 Nozzle(s)
132 Second ink delivery pathway
181 Ink droplet(s)
182 Ink droplet(s)
200 Carriage
250 Printhead chassis
251 Printhead die
253 Nozzle arrays
254 Nozzle array direction
256 Encapsulant
257 Flex circuit
258 Connector board
264 Ink supply
302 Paper load entry direction
303 Print region
304 Media advance direction
305 Carriage scan direction
306 Right side of printer chassis
307 Left side of printer chassis
308 Front of printer chassis
309 Rear of printer chassis
310 Hole (for paper advance motor drive gear)
311 Feed roller gear
312 Feed roller
313 Forward rotation direction
320 Pick-up roller
322 Turn roller
323 Idler roller
324 Discharge roller
325 Star wheel(s)
330 Maintenance station
370 Stack of media
371 Top piece of medium
380 Carriage motor
382 Carriage guide rail
383 Encoder fence
384 Belt
390 Printer electronics board
392 Cable connectors
400 2×2 matrix for level 0
401 2×2 matrix for level 1
402 2×2 matrix for level 2
403 2×2 matrix for level 3
405 Dot pattern for level 0
406 Dot pattern for level 1
407 Dot pattern for level 2
408 Dot pattern for level 3
410 Small dot
420 Large dot
500 2×2 matrix for level 0
501 2×2 matrix for level 1
502 2×2 matrix for level 2
503 2×2 matrix for level 3
505 Dot pattern for level 0
506 Dot pattern for level 1
507 Dot pattern for level 2
508 Dot pattern for level 3

The invention claimed is:

1. A method for printing an image with a printing system, comprising:
   a) providing a first array of dot forming elements for forming dots of a first color and a first size;
   b) providing a second array of dot forming elements for forming dots substantially equivalent to the first color and having a second size that is greater than the first size;
   c) using a multilevel halftoning process to multitone input image data having a number of input levels to produce a multitoned image having a multitone image resolution $R_{Mx} \times R_{My}$ and a number of multitone levels $L_M$, the multitone image resolution being lower than a printing resolution $R_{Px} \times R_{Py}$, and the number of multitone levels being smaller than the number of input levels and higher than a number of printing levels $L_p$;
   d) providing a look-up table, corresponding to the first color, wherein the look-up table is addressed by the multitone level and stores look-up table entries for each of the $L_M$ multitone level values, each look-up table entry being an n×m matrix specifying a pattern of dots of the first size and a pattern of dots of the second size, where $n = R_{Px}/R_{Mx}$ and $m = R_{Py}/R_{My}$, wherein the number of dots of the first size specified by the look-up table is less than or equal to 0.5×(n×m) for every multitone level;
   e) using the look-up table, corresponding to the first color, to expand the multitoned image data from the multitone resolution to a print-ready image having the printing resolution by addressing the look-up table with the multitone levels of the multitoned image; and
   f) printing the print-ready image using the first array of dot forming elements and the second array of dot forming elements.

2. The method of claim 1, wherein step e) includes randomizing the dot positions for each level.

3. The method of claim 1, wherein for each of the $L_M$ n×m matrices, no position within the matrix is specified to have both a dot of the first size and a dot of the second size.

4. The method of claim 1, wherein for each of the $L_M$ n×m matrices, no position within the matrix is specified to have more than one dot.

5. The method of claim 1, wherein n=m=2.

6. The method of claim 1, wherein the number of dots of the second size specified by the look-up table is less than n×m for every multitone level.

7. The method according to claim 1 further comprising:
   providing a third array of dot forming elements for forming dots of a second color and a third size;
   providing a fourth array of dot forming elements for forming dots substantially equivalent to the second color and having a fourth size that is greater than the third size;
   providing a look-up table corresponding to the second color, wherein each value of the $L_M$ multitone level values corresponds to a look-up table entry specifying a number of dots of the third size and a number of dots of the fourth size;
   using the look-up table corresponding to the second color to expand the multitoned image data from the multitone resolution to a print-ready image having a printing resolution; and
   printing the print-ready image using the third array of dot forming elements and the fourth array of dot forming elements.

8. The method of claim 7, wherein the third size is substantially the same as the first size, and wherein the fourth size is substantially the same as the second size.

9. The method of claim 7, wherein the look-up table corresponding to the second color is the same as the look-up table corresponding to the first color.

10. The method of claim 1, wherein the look-up table is a first look-up table corresponding to the first color and further corresponding to a first type of media, the method further comprising:
  providing a second look-up table corresponding to the first color and to a second type of media as utilized by the printing system; and
  using the first look-up table to expand the multitoned image data when the first type of media is used in the printing system, or using the second look-up table to expand the multitoned image data when the second type of media is used in the printing system.

11. The method of claim 1 further comprising:
  providing a third array of dot forming elements for forming dots substantially equivalent to the first color and having a third size that is greater than the second size, wherein:
  the look-up table provided in step d) further specifies a number of dots of the third size;
  step e) further includes expanding the multitoned image data from the multitone resolution to a print-ready image having a printing resolution for dots of the third size; and
  step f) further includes using the third array of dot forming elements.

12. A method for printing an image with an inkjet printing system, comprising:
  a) providing N pairs of arrays of drop ejectors wherein both members of each pair eject substantially same hue and density of ink, and wherein one member of each pair ejects a smaller drop size and the other member of the pair ejects a larger drop size;
  b) using a multilevel halftoning process to multitone input image data having a number of input levels to produce a multitoned image having a multitone image resolution $R_{Mx} \times R_{My}$ and a number of multitone levels $L_M$, the multitone resolution being lower than a printing resolution $R_{Px} \times R_{Py}$, and the number of multitone levels being smaller than the number of input levels and higher than the number of printing levels $L_P$;
  c) providing a look-up table corresponding to each hue and density of ink, wherein the look-up table is addressed by the multitone level and stores look-up table entries for each of the $L_M$ multitone level values, each look-up table entry being an n×m matrix specifying a pattern of drops of the smaller size and a pattern of drops of the larger size for that hue and density of ink, where $n=R_{Px}/R_{Mx}$ and $m=R_{Py}/R_{My}$, wherein the number of dots of the first size specified by the look-up table is less than or equal to 0.5×(n×m) for every multitone level;
  d) using the look-up tables corresponding to each hue and density of ink to expand the multitoned image data from the multitone resolution to a print-ready image having the printing resolution by addressing the look-up table with the multitone levels of the multitoned image; and
  e) printing the print-ready image using the N pairs of arrays of drop ejectors.

13. The method of claim 12, wherein N is greater than 4.

14. An inkjet printing system comprising:
  N varieties of ink;
  N pairs of arrays of drop ejectors adapted to print an image at a printing resolution $R_{Px} \times R_{Py}$, wherein both members of each pair eject substantially the same variety of ink, and wherein one member of each pair ejects a smaller drop size and the other member of the pair ejects a larger drop size;
  a multitoning processor that produces a multitoned image by using a multilevel halftoning process to multitone input image data having a number of input levels, the multitoned image having a multitone image resolution $R_{Mx} \times R_{My}$ and a number of multitone levels $L_M$, the multitone image resolution being lower than a printing resolution $R_{Px} \times R_{Py}$, and the number of multitone levels being smaller than the number of input levels and higher than a number of printing levels $L_P$; and
  memory including N look-up tables, each look-up table corresponding to one of the N varieties of ink, wherein each look-up table is addressed by the multitone level and stores look-up table entries for each of the $L_M$ multitone level values, each look-up table entry being an n×m matrix specifying a pattern of drops of the smaller size and a pattern of drops of the larger size, where $n=R_{Px}/R_{Mx}$ and $m=R_{Py}/R_{My}$, wherein the number of dots of the first size specified by the look-up table is less than or equal to 0.5×(n×m) for every multitone level.

15. The inkjet printing system of claim 14, wherein the N varieties of ink include differences in colorant or density.

16. The inkjet printing system of claim 14, wherein the printing system prints at greater than 25 square feet/hour and less than 10% of the multitone image is spooled prior to printing.

17. The inkjet printing system of claim 14, wherein a first one of the N look-up tables is the same as a second one of the N look-up tables.

18. A method for printing an image with a printing system, comprising:
  a) providing a first array of dot forming elements for forming dots of a first color and a first size;
  b) providing a second array of dot forming elements for forming dots substantially equivalent to the first color and having a second size that is greater than the first size;
  c) using a multitoning process to multitone input image data having a number of input levels to produce a multitoned image having a multitone image resolution $R_{Mx} \times R_{My}$ and a number of multitone levels $L_M$, the multitone image resolution being lower than a printing resolution $R_{Px} \times R_{Py}$, and the number of multitone levels being smaller than the number of input levels and higher than a number of printing levels $L_P$;
  d) providing a look-up table, corresponding to the first color, wherein the look-up table is addressed by the multitone level and stores a look-up table entries for each of the $L_M$ multitone level values, each look-up table entry being an n×m matrix specifying a pattern of dots of the first size and a pattern of dots of the second size, where $n=R_{Px}/R_{Mx}$ and $m=R_{Py}/R_{My}$, wherein the number of dots of the second size specified by the look-up table is less than n×m for every multitone level. e) using the look-up table, corresponding to the first color, to expand the multitoned image data from the multitone resolution to a print-ready image having the printing resolution by addressing the look-up table with the multitone levels of the multitoned image; and
  f) printing the print-ready image using the first array of dot forming elements and the second array of dot forming elements.

19. The method of claim 18, wherein the number of dots of the first size specified by the look-up table is less than n×m.

20. The method of claim 18, wherein the number of dots of the first size specified by the look-up table is less than or equal to 0.5×(n×m) for every multitone level.

* * * * *